United States Patent [19]

Guadagnin et al.

[11] 4,413,530
[45] Nov. 8, 1983

[54] DEVICE FOR MEASURING AND MONITORING GAS FLOWRATES

[75] Inventors: Laurent J. Guadagnin; Claude R. Grossiord, both of Annecy, France

[73] Assignee: Cricket Sarl, France

[21] Appl. No.: 237,164

[22] PCT Filed: Jun. 13, 1980

[86] PCT No.: PCT/FR80/00094
 § 371 Date: Feb. 17, 1981
 § 102(e) Date: Feb. 17, 1981

[87] PCT Pub. No.: WO80/02874
 PCT Pub. Date: Dec. 24, 1980

[30] Foreign Application Priority Data
 Jun. 15, 1979 [FR] France .................. 79 15438

[51] Int. Cl.³ .............................................. G01F 1/38
[52] U.S. Cl. ................................. 73/861.47; 73/861.52
[58] Field of Search .......... 73/861.42, 861.47, 861.52; 137/501; 138/43

[56] References Cited

U.S. PATENT DOCUMENTS

| | | | |
|---|---|---|---|
| 1,653,438 | 12/1927 | McLean | 73/861.47 |
| 2,867,757 | 1/1959 | Wagner | 73/861.47 X |
| 3,562,782 | 2/1971 | Zychal | 138/43 |
| 3,621,866 | 11/1971 | Thorsheim | 137/501 X |
| 4,096,746 | 6/1978 | Wilson et al. | 73/861.52 X |

Primary Examiner—Herbert Goldstein
Attorney, Agent, or Firm—Robert A. Shack

[57] ABSTRACT

An apparatus for measuring the fluid flowrate through a system whose through flowrate is to be measured, which includes a first chamber in fluid communication and substantial pressure equilibrium with a constant pressure source, a second chamber in fluid communication with the constant pressure source through a flow restrictor whose through flowrate is substantially equal to the through flowrate of the system to be measured, a valve having an upstream port in fluid communication with the second chamber and a downstream port adapted to receive and connect with the system to be measured, the valve being selectively actuable to establish or block fluid communication between the second chamber and the system to be measured, and a measuring device for measuring the pressure difference between the first and second chambers.

4 Claims, 4 Drawing Figures

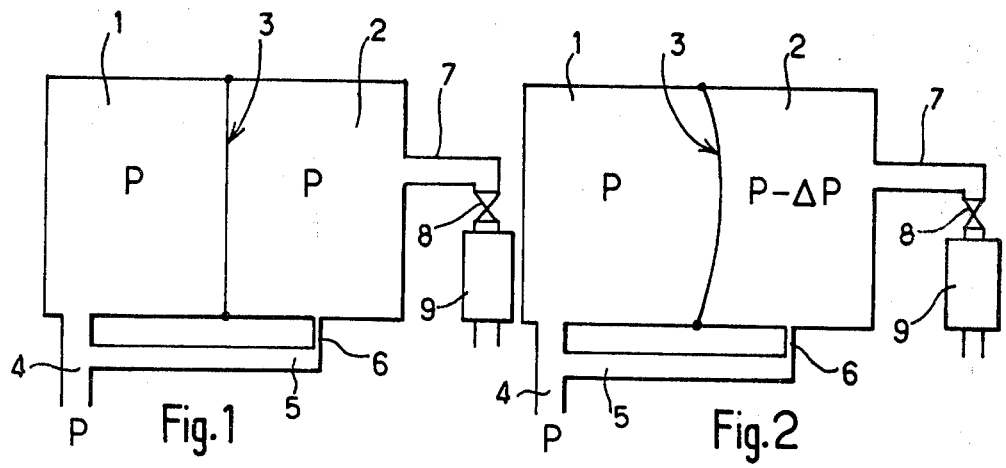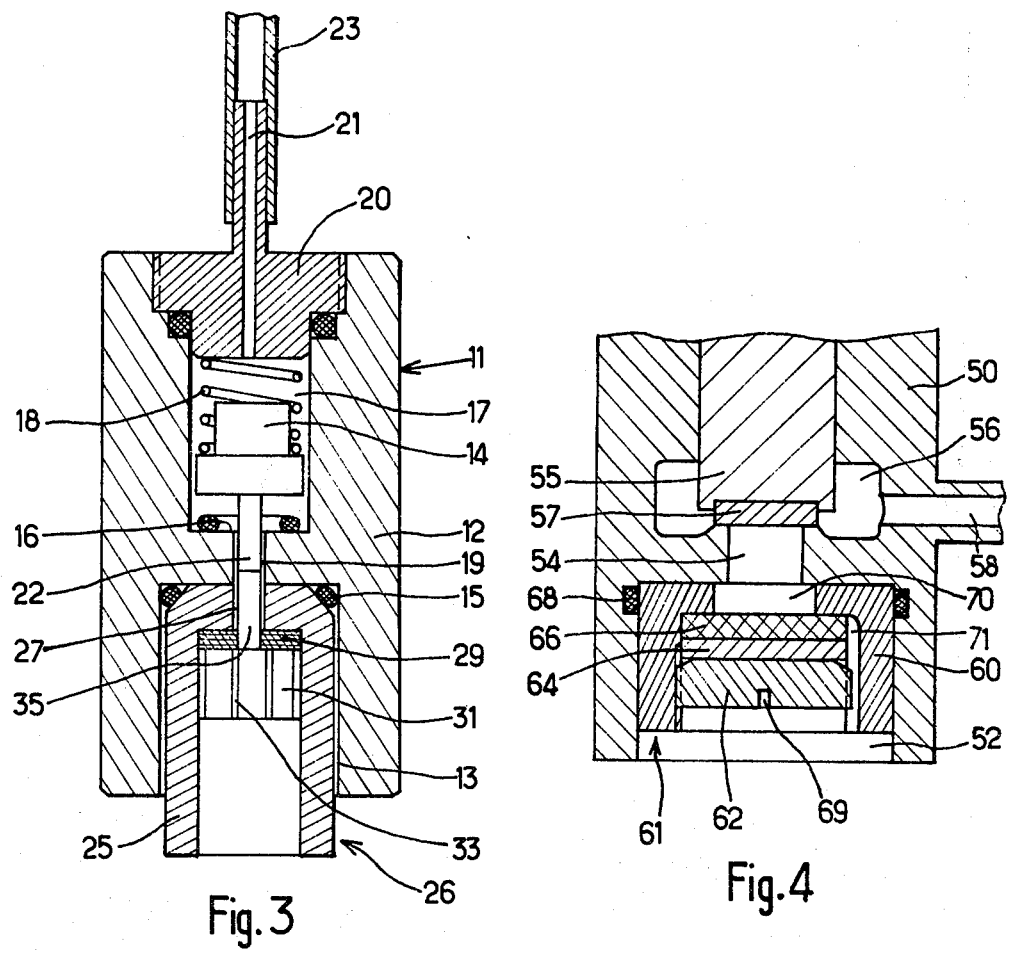

DEVICE FOR MEASURING AND MONITORING GAS FLOWRATES

BACKGROUND OF THE INVENTION

1. Field of the Invention

The present invention relates to improvements made to gas flowrate measuring and monitoring devices, in particular devices with low flowrates.

2. Description of the Prior Art

Certain known devices use the deformation of two deformable chambers supplied with the same gas pressure higher than atmospheric pressure, to measure and monitor the gas flowrate.

In these devices, one of the chambers is supplied with said gas pressure through a flowrate restriction device, the flowrate of which is substantially the same order of magnitude as that to be measured. Moreover, this chamber can be placed in communication with the ambient atmosphere and hence with atmospheric pressure when the device is in the resting position, and in communication with the system of which the flowrate is to be measured, when the device is in the measuring position.

In the resting position, the pressure prevailing in the first chamber is the supply pressure, and the pressure in the second chamber is close to atmospheric pressure.

In the measuring position, the pressure prevailing in the first chamber remains equal to the supply pressure, and the pressure in the second chamber increases up to a value slightly less than the supply pressure; the difference in pressure results from the pressure loss experienced by the gas flow as it passes through the system whose flowrate is to be measured and hence depends on the flowrate of the latter.

Thus, it is the difference in pressure between the two chambers that enables the flowrate to be monitored to be measured and, for this purpose, deformation of these chambers is detected, which deformation can be amplified in any fashion—mechanically, electronically, or otherwise.

The drawback of this type of device resides in the fact that it has a relatively long response time, which is inherent in its very design, since the pressurized gas passes into the second chamber at the time of measurement through the flowrate restriction device. If a more precise measurement were to be made, the flowrate of the restriction device would have to be decreased by comparison with the flowrate to be measured, which would extend the response time even longer, while to cut down the response time a restriction device with a higher flowrate than the flowrate to be measured would have to be provided, in which case measurement would be less accurate.

SUMMARY OF THE INVENTION

The purpose of the present invention is to supply a device for measuring and monitoring low gas flowrates which has both a short response time and high sensitivity.

The device according to the invention has two deformable chambers, the first being solely and permanently in direct communication with a pressure source and the second being, on the one hand, permanently in communication with a source at the same pressure through a flowrate restriction device whose flowrate is substantially the same as the flowrate desired for the system to be monitored and, on the other hand, when the device is in the measuring position, in communication with the atmosphere through the system to be monitored, characterized by a valve being disposed on the gas path between the second chamber and the system to be monitored, said valve being closed when the device is in the resting position and open when the device is in the measuring or monitoring position.

The first advantage of such a device is the decrease in response time due essentially to the small differential between the resting and the measuring pressures. Because of this small differential, only a small volume of gas need be passed through the flowrate restriction device for the device to be set in the measuring configuration.

A second advantage, derived from the first, is that, because of its rapid response, a device according to the invention can be used continuously to monitor an adjustment operation while it is in process, as will be explained hereinbelow.

Other advantages will appear in the course of the description hereinbelow with regard to the attached drawings which provide, for indicative and not limitative purposes, some embodiments of the invention, wherein:

BRIEF DESCRIPTION OF THE DRAWINGS

FIGS. 1 and 2 show schematically the application of the invention to the flowrate-measuring process in the resting position and measuring position, respectively.

FIGS. 3 and 4 give two variant applications of the invention.

DESCRIPTION OF THE PREFERRED EMBODIMENT

In FIGS. 1 and 2, the device has two chambers 1 and 2 separated by a deformable membrane 3.

Chamber 1 is connected directly by a tube 4 to a pressure source P, not shown, at higher than atmospheric pressure.

Chamber 2 is connected to the same pressure source P by means of a branch line 5 and a restriction device 6. It also has an outgoing line 7 connected by means of valve 8 to a system 9 to be monitored.

In the resting position (FIG. 1) valve 8 is closed such that the pressure is identical to that inside chambers 1 and 2 and equal to source pressure P. As a result, membrane 3 is no longer deformed.

When valve 8 is open (FIG. 2) chamber 2 is placed in communication with the atmosphere via system 9 to be monitored and, hence, there is a pressure drop in this chamber. This chamber is always in communication with pressure source P, but because of the pressure loss caused by flowrate restriction device 6, the pressure remains less than P. It is precisely the pressure differential between chambers 1 and 2 which enables the flowrate of system 9 to be measured.

This pressure differential causes membrane 3 to deform, which deformation can be amplified and converted to a measurement of the gas flowrate inside system 9 to be monitored, by classical means, for example mechanical, electronic, or other, not shown.

Since, in each chamber, the pressures are the same at rest and when the measuring configuration is initiated, the response time is obviously decreased by comparison with known devices wherein chamber 2 must pass from atmospheric pressure, which is its pressure in the resting state, to the pressure of the other chamber in order for the measuring operation to be able to take place.

In order further to decrease the response time of the device, the applicant has designed and developed the valve illustrated in FIG. 3.

This valve, designated by general reference number 11, essentially comprises a body 12, a poppet 14, a plug 20, and a spring 18.

At its lower part, body 12 has a cavity 13 at the bottom of which is accommodated an O-ring 15. The upper part of body 11 comprises a second cylindrical cavity 17 communicating with cavity 13 by a passage 19 wherein poppet 14 is accommodated. The latter is forced against the bottom 16 of cavity 17 via spring 18 which rests on a plug 20, screwed into the upper part of said cavity 17.

The lower part of poppet 14 is provided with a guide 22 which passes through passage 19 and emerges in lower cavity 13.

Cavity 17 communicates with the second chamber 2 of the measuring device by a line 23 connected to a tubulature 21 which is made integral with plug 20.

The assembly 26 of which the flowrate is to be measured is composed of a bell 25 whose bottom is pierced by a passage 27 and inside which is placed a washer 29 made of a permeable, compressible material. This washer is crushed against the bottom of said bell by a stopper 31 provided with longitudinal flutes 33 on its periphery and a central pin 35.

The assembly formed by the device of FIG. 1 and the valve of FIG. 3 functions as follows:

Initially poppet 14 is forced against its seat 16 such that chamber 2 of the measuring device of FIG. 1 is pressurized. Assembly 26 is then introduced into cavity 13 and placed against the bottom of this cavity. During this placement operation, pin 35 forces back guide 22 and raises poppet 14, placing chamber 2 in communication with the atmosphere through permeable compressible washer 29, passage 19, cavity 17, tubulature 21, and line 23.

As has already been explained, a pressure drop occurs in chamber 2, resulting in deformation of membrane 3, and measuring this deformation reveals the flowrate of system 26.

It should be noted that pin 35 and guide 22, by their presence in passages 19 and 27, contribute to decreasing the dead volume existing between the blocking means composed of poppet 14, O-ring 15, and washer 29.

FIG. 4 shows another embodiment of the valve according to the invention which not only enables the flowrate to be measured by means of a permeable washer in a given state of compression, but also enables the operation of adjusting the compression status of the permeable washer until the desired flowrate is obtained, to be continuously monitored. This case occurs in particular when it is desired to adjust the flowrate of a liquefied-gas lighter expansion valve.

This expansion valve, designated by general reference 61, is composed of a cylindrical jacket 60 with internal threads, having several lengthwise grooves 71. Inside said envelope are disposed successively a compressible, permeable pellet 66, a metal washer 64, and a compressing device 62, provided with a slot 69, which screws into cylindrical jacket 60.

To adjust such an expansion valve, compressing device 62 is screwed down more or less using slot 69, causing compressible permeable pellet 66 to be crushed between metal washer 64 and the bottom of cylindrical jacket 60.

The gas passing through grooves 71 arrives at compressible permeable pellet 66, through whose compressed part it must pass. The central part of the pellet could be used, by means of the wide orifice 70 provided in the bottom of cylindrical jacket 60, to bring about a second adjustment beyond the limit imposed by the compressed part of the pellet.

The device used to adjust expansion valve 61 is composed of a cylindrical body 50 having the following, arranged sequentially: at its upper part, an accommodation receiving a poppet 55 provided at its end with a seal 57; at its middle, a chamber 56 connected by a passage 58 to chamber 2 in FIGS. 1 and 2, and a passage 54; and, at its lower part, a cavity 52.

For adjustment purposes, the latter receives expansion valve 61 whose periphery is isolated from passage 54 by an O-ring 68.

The device according to FIG. 4 operates as follows:

Before the measuring operation, chamber 56 is at the same pressure P as chamber 2 in FIG. 1.

When poppet 55 is lifted by some means not part of the present invention, chamber 56 is placed in communication with the atmosphere through compressible, permeable pellet 66 and through grooves 71 and hence the pressure in chamber 2 drops. If this pressure drop does not correspond to the desired flowrate, it can be varied by screwing or unscrewing compressing device 62. In the case, for example, where the pressure drop is too severe, compressing device 62 is screwed down and, because of the gas arriving in chamber 2 from the pressure source, the pressure rises in this chamber as compresing device 62 is screwed down.

When the desired value is reached, screwing is stopped and the expansion valve can be removed from the device according to the invention.

Obviously, it is the reaction speed of the device according to the invention which enables it to be used to monitor and adjustment operation while the latter is in progress.

While the invention has been illustrated by way of a description of a preferred embodiment, substitutions of various equivalents can be effected which do not depart from the spirit or scope of the invention as set forth in the appended claims.

What is claimed as new and desired to be secured by Letters Patent of the United States is:

1. Apparatus for measuring the flowrate of a fluid through a system whose through flowrate is to be measured, comprising:
   a first chamber in fluid communication and substantial pressure equilibrium with a substantially constant pressure source;
   a second chamber in fluid communication with said constant pressure source through a flow restrictor having a through flowrate substantially equal to the through flowrate of the system to be measured;
   a valve having an upstream port and a downstream port, said upstream port being in fluid communication with said second chamber and said downstream port being adapted to receive and connect with the system to be measured, said valve being selectively actuable between a first state wherein fluid communication between said second chamber and the system to be measured is blocked and a second state wherein fluid communication between said second chamber and the system to be measured is established;
   means for actuating said valve from said first state to said second state upon connection of the sysstem to be measured to said valve and for actuaing said valve from said second state to said first state upon disconnection of the system to be measured from said valve; and pressure difference measuring means for measuring the pressure difference between said first and second chambers.

2. The apparatus of claim 1, wherein said valve includes a passageway connecting said second chamber and the system to be measured when said system is connected to said valve, and further comprising blocking means for blocking fluid communication through said passageway, at least a portion of said blocking means being disposed within said passageway.

3. The apparatus of claim 2, wherein said blocking means comprises a poppet valve member and said portion comprises a stem of said poppet valve member.

4. The apparatus of claim 3, wherein said first and second chambers have a common deformable wall and wherein said pressure difference measuring means comprises means for detecting a deformation of said wall.

* * * * *